United States Patent [19]

Susa et al.

[11] 4,016,244
[45] Apr. 5, 1977

[54] PROCESS FOR PRODUCTION OF CUBIC BORON NITRIDE

[75] Inventors: Kenzo Susa, Hachioji; Toshio Kobayashi, Kokubunji; Satoshi Taniguchi, Tokorozawa; Mitsuru Ishii, Higashi-yamato, all of Japan

[73] Assignee: Hitachi, Ltd., Japan

[22] Filed: Jan. 23, 1975

[21] Appl. No.: 543,430

[30] Foreign Application Priority Data

| Jan. 23, 1974 | Japan | 49-9372 |
| Feb. 27, 1974 | Japan | 49-22349 |
| May 8, 1974 | Japan | 49-50301 |
| Apr. 26, 1974 | Japan | 49-46484 |

[52] U.S. Cl. ............................................. 423/290
[51] Int. Cl.$^2$ ..................................... C01B 35/14
[58] Field of Search ........................... 423/290, 446

[56] References Cited

UNITED STATES PATENTS

| 3,212,851 | 10/1965 | Bundy et al. | 423/290 |
| 3,661,521 | 5/1972 | Birle | 423/290 |
| 3,768,972 | 10/1973 | Taylor et al. | 423/290 X |
| 3,918,219 | 11/1975 | Wentorf | 423/290 X |

FOREIGN PATENTS OR APPLICATIONS 2,219,394  1/1973  Germany

*Primary Examiner*—G. O. Peters
*Attorney, Agent, or Firm*—Craig & Antonelli

[57] ABSTRACT

In synthesizing cubic boron nitride from hexagonal boron nitride under high temperature and high pressure conditions, if water is incorporated into the raw material in an amount of at least 3% by weight, cubic boron nitride of a higher purity in the form of smaller crystallites than in conventional products can be obtained under lower temperature and lower pressure conditions than in conventional methods. When graphitic hexagonal boron nitride is used as the raw material, the temperature and pressure necessary for synthesis can be reduced to about 600° C. and 50 Kbar, respectively.

13 Claims, 4 Drawing Figures

PROCESS FOR PRODUCTION OF CUBIC BORON NITRIDE

BACKGROUND OF THE INVENTION

This invention relates to a process for the production of cubic boron nitride. More particularly, the invention relates to a process for synthesizing cubic boron nitride by applying high temperature and high pressure to hexagonal boron nitride.

BRIEF DESCRIPTION OF THE PRIOR ART

Because of the very high hardness and good heat conductivity, cubic boron nitride is used as a cutting tool material and attracts attention in the art as a polishing material, an abrasive material, a wear-resistant material, a heat sink material or the like.

As the conventional method for production of cubic boron nitride, there are mentioned a catalysis method using a metal catalyst and a direct method not using a catalyst. According to the catalysis method, an element of Group I$a$, II$a$ or III$a$ of the Periodic Table, such a metal as Sb, Sn or Pb or a nitride thereof is mixed as a catalyst with hexagonal boron nitride and synthesis is conducted in the thermodynamically stable region of cubic boron nitride, namely at a pressure of at least 45 Kbar and a temperature of at least 1,500° C. Therefore, this method is defective in that a very high temperature is necessary for synthesis and incorporation of an impurity of the metal element used as the catalyst cannot be avoided in the resulting cubic boron nitride product. In the direct synthesis method not using a catalyst, it is indispensable to apply a high pressure of at least 115 Kbar and a high temperature exceeding about 1,900° C. [Bundy et al; J. Chem. Phys., 38 (1963) p. 1144], and therefore, it is very difficult to industrialize this direct method.

Recently, as an improvement of the direct synthesis method, there was proposed a method in which synthesis is performed at a high pressure of more than 60 Kbar and a high temperature of 1,200° C. or higher [Wakatsuki et al; Mat. Res. Bull., 7 (1972), P.999]. This method is still insufficient in that it is indispensable to employ as the raw material lowly crystalline hexagonal boron nitride in the form of a fine powder having a grain size less than 1$\mu$, and the temperature is still rather high.

SUMMARY OF THE INVENTION

It is a primary object of this invention to provide a process for the production of cubic boron nitride in which the above-mentioned defects involved in the conventional methods can be overcome and cubic boron nitride of good quality can be produced even under low temperature and low pressure conditions.

In accordance with this invention, this object can be attained by incorporating water into the raw material in an amount of at least 3% by weight in synthesizing cubic boron nitride from hexagonal boron nitride as the raw material under high temperature and high pressure conditions.

Figure 1:
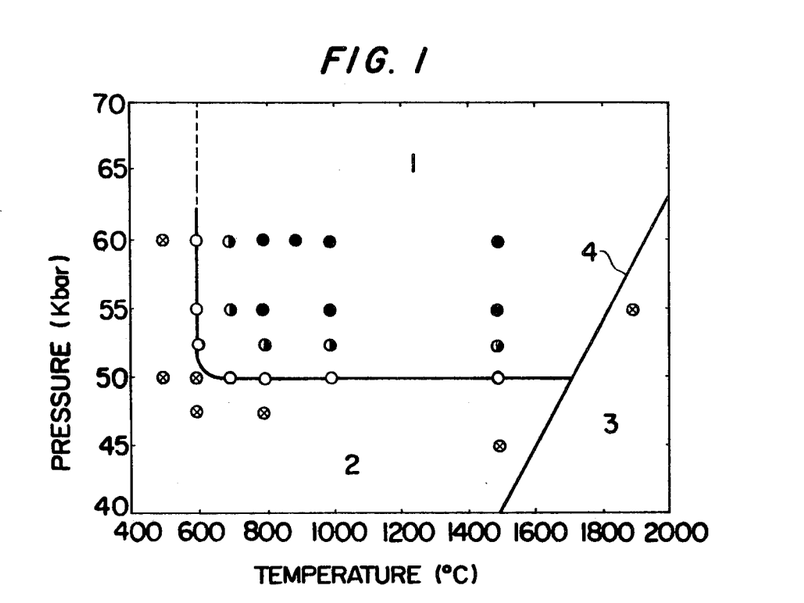
FIG. 1 is a graphical representation illustrating ranges of the temperature and pressure necessary for synthesizing cubic boron nitride from a graphitic hexagonal boron nitride raw material containing 42% by weight of water.
Figure 3:
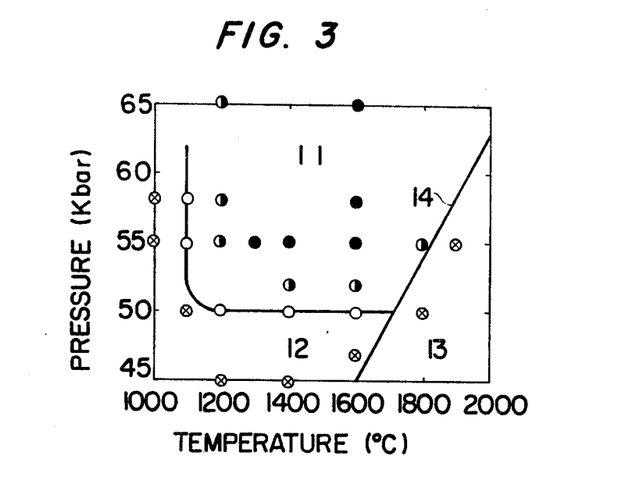
FIG. 3 is a graphical representation illustrating ranges of the temperature and pressure necessary for synthesizing cubic boron nitride from a wurtzitic type hexagonal boron nitride raw material containing 42% by weight of water.

In the process of this invention, the pressure necessary for the synthesis is at least about 50 Kbar (and is preferably larger than 50 Kbar as shown in FIG. 1, appended hereto), and the temperature necessary for the synthesis is at least about 600° C., when the raw material is graphitic hexagonal boron nitride, or at least about 1,100° C., when the raw material is wurtzitic type hexagonal boron nitride. It is necessary that these temperature and pressure conditions should be included in the thermodynamically stable region of cubic boron nitride. The thermodynamically stable region of cubic boron nitride is illustrated in F. P. Bundy et al; Journal of Chem. Phys., 38 (1963), p. 1144, and a part of this region is shown in appended FIG. 1, which will be detailed hereinafter. The upper temperature limits for each of the treatments at a given water content are represented by the curve or line 4 of FIG. 1 corresponding with curve or line 14 of FIG. 3, which depend on the applied pressure. When temperatures higher than those represented by the line 4 of FIG. 1 or line 14 of FIG. 3 are employed, the products have not a cubic crystal structure, but have a graphitic hexagonal structure.

As the source for incorporation of water into the raw material, there can be used not only water per se but also an aqueous solution of an alkaline substance such as an aqueous solution of ammonia and a hydrate such as LiOH·H$_2$O. In case a water source other than water per se is used, it is necessary that this source should be incorporated into the raw material in an amount of at least 3% by weight as calculated as water.

The intended effect can always be attained if only the amount of water is 3% by weight or larger, and as the amount incorporated of water increases, a higher effect can be obtained. Especially when the amount of water is at least 10–20% by weight (at least about 20% in the case of graphitic hexagonal boron nitride and at least about 10% by weight in the case of wurtzitic type hexagonal boron nitride), the pressure necessary for the synthesis can be minimized and good results can be obtained. If the water content in the raw material is lower than 3% by weight, for example, 1% by weight or lower, the pressure necessary for the synthesis increases abruptly, and therefore, such a low water content is not preferred. The upper limit of the water content is not particularly critical, but if the water content in the raw material is too large, the amount of boron nitride that can be treated is reduced as compared with the amount of water, and the yield of intended cubic boron nitride is reduced and the synthesis efficiency is lowered. Further, it becomes difficult to handle the materials containing the water, the amount of which is over about 2/3 of the total weight. Accordingly, the preferable amount of water to be incorporated is less than about 2/3 of the total weight of the starting materials.

When an aqueous solution of an alkaline substance is used as the water source, especially good results are obtained by the use of an aqueous solution of a member selected from the group consisting of NH$_4$OH, NaOH, KOH, LiOH, Mg(OH)$_2$, Ca(OH)$_2$, Sr(OH)$_2$ and Ba(OH)$_2$. Use of an aqueous solution of NH$_4$OH is most preferred, because the best results are obtained.

When the temperature and/or pressure adopted for the synthesis are lower than the heretofore-mentioned values, preparation of cubic boron nitride becomes difficult. If the reaction time is drastically prolonged, it may probably be possible to synthesize cubic boron nitride even when the temperature and/or pressure are lower than the heretofore-mentioned values, but from the practical viewpoint, it is preferred to adopt temperature and pressure conditions within the heretofore-mentioned ranges. It must be noted that even if only the temperature is raised very much, unless the pressure is elevated to a suitable level, the conditions deviate from the thermodynamically stable region of cubic boron nitride and it is impossible to synthesize cubic boron nitride. When the process of this invention is conducted under the heretofore-mentioned temperature and pressure conditions, sufficiently good results can be obtained if the reaction is continued for about 30 minutes, and in this invention it is possible to shorten the reaction time to about 2 minutes. The reaction time may be prolonged unrestrictedly, but from the practical viewpoint too long a reaction time is not preferred. Thus, the upper limit for the reaction time ranges from 1 hour to 24 hours approximately according to the reaction temperature from the practical viewpoint.

The first effect attained in this invention is that the temperature necessary for the synthesis can be greatly reduced regardless of the state or condition of the raw material, namely regardless of the crystallinity or the grain size of the raw material, only by incorporating water in an amount of at least about 3% by weight, and that when graphitic hexagonal boron nitride is used as the raw material, the minimum temperature necessary for the synthesis can be reduced to about 600°C. by increasing the amount of water incorporated into the raw material. This effect is owing to the fact that the reaction rate in the synthesis of cubic boron nitride is highly enhanced by addition of water.

The second effect attained in this invention is that in cubic boron nitride crystals prepared according to the process of this invention, the grain size is as small as about 0.1 to about 1$\mu$ regardless of the crystallinity or grain size of the raw material and the grain size of cubic boron nitride synthesized by using graphitic hexagonal boron nitride as the raw material and a relatively low temperature (for example, about 800°C.) is further lessened to 0.01$\mu$ or smaller. At present the hexagonal boron nitride on the market having any grain, which is generally less than several $\mu$, can be employed. This effect is due greatly to the above-mentioned first effect that the synthesis temperature can be much reduced as compared with the synthesis temperatures adopted in the conventional methods. It is generally admitted that the grain size grows with elevation of the applied temperature. Since sintering is facilitated with reduction of the grain size, cubic boron nitride prepared according to the process of this invention is especially suitable as a sintering material.

The third effect attained in this invention is that the minimum pressure necessary for the synthesis can be reduced to a level much lower than the conventional methods, namely to about 60 Kbar or lower, regardless of the crystallinity or grain size of the raw material only by incorporating water in an amount of at least about 3% by weight. The minimum pressure necessary for the synthesis can be reduced up to about 50 Kbar by increasing the amount of incorporated water.

The fourth effect attained in this invention is that the purity of cubic boron nitride prepared according to this invention by addition of water or aqueous ammonia is approximately equal to the purity of the starting hexagonal boron nitride.

In practicing the process of this invention, it is indispensable to incorporate water into the starting boron nitride and to employ a high temperature and high pressure generating apparatus. In this invention, either the method for incorporation of water or the method or apparatus for generating high temperature and high pressure is not particularly critical. Any of the methods capable of providing raw materials having a prescribed water content and any of the methods and apparatus capable of generating the prescribed temperature and pressure simultaneously can be used in this invention.

BRIEF DESCRIPTION OF THE DRAWINGS

This invention will be more apparent from the detailed description given hereafter by reference to the accompanying drawings and examples wherein.

DESCRIPTION OF THE PRESENTLY PREFERRED EMBODIMENTS

EXAMPLE 1

Graphitic hexagonal boron nitride having an average grain size of about 0.05$\mu$ was used as the starting boron nitride and synthesis of cubic boron nitride was examined under such reaction conditions as a water content of 42% by weight, a pressure of 45 to 60 Kbar, a temperature of 500 to 1,900°C. and a reaction time of 30 minutes, to obtain results shown in Table 1. Pyrophillite was used as a pressure medium, and in the pressure causing the pressure induced phase transition at room temperature, the following substances were used as standards for measuring the pressure. Namely, the transition pressure between Bi(I) and Bi(II) was regarded as 25.5 Kbar, the transition pressure between Tl(II) and Tl(III) as 36.7±0.3 Kbar, the transition pressure between Ba(I) and Ba(II) as 55±2 Kbar, and the transition pressure between Bi(III) and Bi(V) as 77±3 Kbar.

Table 1

| Sample No. | Pressure, Kbar | Temperature, °C. | Yield, % |
|---|---|---|---|
| 1 | 60 | 1,500 | 100 |
| 2 | 60 | 1,000 | 100 |
| 3 | 60 | 900 | 99 |
| 4 | 60 | 800 | 92 |
| 5 | 60 | 700 | 35 |
| 6 | 60 | 600 | * |
| 7 | 60 | 500 | ** |
| 8 | 55 | 1,900 | ** |
| 9 | 55 | 1,500 | 80 |
| 10 | 55 | 1,000 | 83 |
| 11 | 55 | 800 | 72 |
| 12 | 55 | 700 | 53 |
| 13 | 55 | 600 | * |
| 14 | 53 | 1,500 | 28 |
| 15 | 53 | 1,000 | 36 |
| 16 | 53 | 800 | 20 |
| 17 | 53 | 600 | * |
| 18 | 50 | 1,500 | * |

Table 1-continued

| Sample No. | Pressure, Kbar | Temperature, °C | Yield, % |
|---|---|---|---|
| 19 | 50 | 1,000 | * |
| 20 | 50 | 800 | * |
| 21 | 50 | 700 | * |
| 22 | 50 | 600 | ** |
| 23 | 50 | 500 | ** |
| 24 | 48 | 800 | ** |
| 25 | 48 | 600 | ** |
| 26 | 45 | 1,500 | ** |

\* : formation of cubic boron nitride was confirmed by the X-ray diffractiometry but the yield was 19% or lower.
\*\*: formation of cubic boron nitride was not confirmed by the X-ray diffractiometry.

Identification of cubic boron nitride and hexagonal boron nitride was performed by the X-ray diffractiometry, and the yield of cubic boron nitride was determined based on the X-ray intensity ratio.

The ranges of the temperature and pressure capable of providing cubic boron nitride, determined from the foregoing results, are shown in FIG. 1. In FIG. 1, the ordinate indicates the synthesis pressure (Kbar) and the abscissa indicates the synthesis temperature (°C.). At points ● cubic boron nitride was synthesized in a yield of 80% of higher, at points ◐ cubic boron nitride was synthesized in a yield of 20 to 79%, at points ○ formation of cubic boron nitride was confirmed by the X-ray diffractiometry but the yield was 19% or lower, and at points ⊗ formation of cubic boron nitride was not confirmed by the X-ray diffractiometry. In FIG. 1, the region 1 is a region where cubic boron nitride can be synthesized, the region 2 is a region where cubic boron nitride is not formed to such an extent that its formation can be confirmed by the X-ray diffractiometry, the region 3 is a region where graphitic hexagonal boron nitride is thermodynamically stable, and the curve 4 is a thermodynamic equilibrium curve of cubic boron nitride and hexagonal boron nitride.

In the X-ray diffraction diagrams of the cubic boron nitride products synthesized in this Example, very broad diffraction patterns were obtained in the products synthesized at lower temperatures. Such broad diffraction pattern is considered to be due to the fact that the grain size of the cubic boron nitride product was very small. In fact, when the product synthesized at 800°C. and 60 Kbar was examined by a microscope, it was found that the obtained cubic boron nitride had a grain size smaller than 0.01$\mu$.

From the foregoing synthesis experiment results, it was confirmed that when graphitic hexagonal boron nitride is used as the raw material, the minimum temperature and pressure necessary for the synthesis detectable by X-ray diffractiometry are 600°C. and 50 Kbar, respectively. There is, however, a possibility that cubic boron nitride will be synthesized in the presence of the prescribed amount of water at lower temperature and pressure to such an extent that formation can be confirmed by X-ray, if the reaction time be prolonged. Further, even under synthesis conditions where the yield of cubic boron nitride was 19% or lower by the X-ray measurement, it will be possible to increase the yield if the reaction be continued for a long time.

As is apparent from sample No. 8, even if the above temperature and pressure conditions are satisfied, when these conditions are not included in the thermodynamically stable region of cubic boron nitride, it is impossible to synthesize cubic boron nitride. Since it is known that cubic boron nitride is thermodynamically stable on the left side of the equilibrium curve 4 shown in FIG. 1, it is indispensable that the synthesis temperature and pressure should be included in this stable region.

In the run where the synthesis was carried out at 60 Kbar and 1,000°C., only by conducting the reaction for 3 minutes, the yield of cubic boron nitride was as high as about 50%.

EXAMPLE 2

Figure 2:
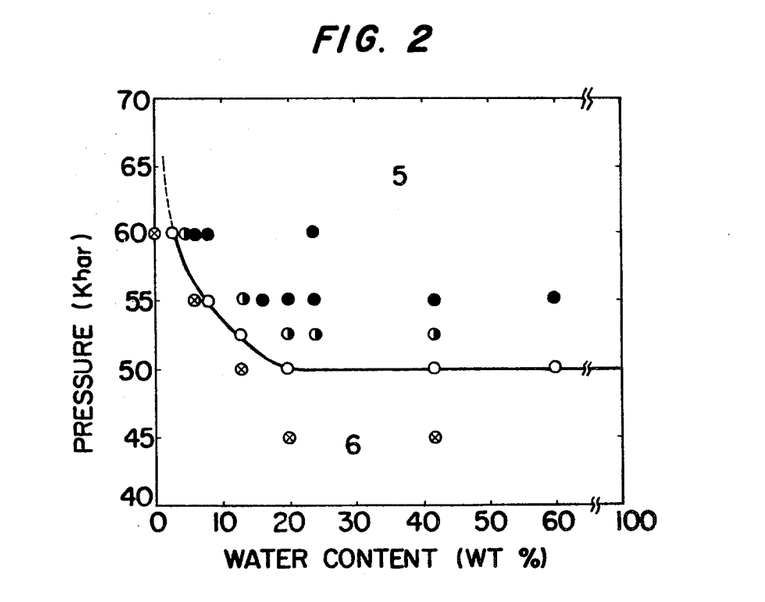
FIG. 2 is a graphical representation illustrating ranges of the pressure and water content in the raw material which are necessary for synthesizing cubic boron nitride when graphitic hexagonal boron nitride is used as the raw material and the synthesis temperature is 1,000°C.

Cubic boron nitride was synthesized from the same starting boron nitride as used in Example 1 under such conditions as a water content of 0 to 60% by weight, a pressure of 40 to 60 Kbar, a temperature of 1,000°C. and a reaction time of 30 minutes, to obtain results shown in Table 2. The apparatus and measurement method were the same as described in Example 1. Ranges of the pressure and water content capable of providing cubic boron nitride, determined based on these results, are shown in FIG. 2. In FIG. 2, the ordinate indicates the synthesis pressure (Kbar) and the abscissa indicates the water content (% by weight) in the raw material. The region 5 is a region where cubic boron nitride could be synthesized, and the region 6 is a region in which cubic boron nitride could not be synthesized to such an extent that its formation could be confirmed by the X-ray diffractiometry. Symbols of measurement points such as ● have the same meaning as mentioned in Example 1.

Table 2

| Sample No. | Water Content (% by weight) | Pressure (Kbar) | Yield (%) |
|---|---|---|---|
| 1 | 0 | 60 | ** |
| 2 | 3 | 60 | * |
| 3 | 5 | 60 | 30 |
| 4 | 6 | 60 | 98 |
| 5 | 8 | 60 | 99 |
| 6 | 24 | 60 | 100 |
| 7 | 6 | 55 | ** |
| 8 | 8 | 55 | * |
| 9 | 13 | 55 | 35 |
| 10 | 16 | 55 | 80 |
| 11 | 20 | 55 | 97 |
| 12 | 24 | 55 | 86 |
| 13 | 42 | 55 | 80 |
| 14 | 60 | 55 | 98 |
| 15 | 13 | 53 | * |
| 16 | 20 | 53 | 26 |
| 17 | 24 | 53 | 30 |
| 18 | 42 | 53 | 36 |
| 19 | 13 | 50 | ** |
| 20 | 20 | 50 | * |
| 21 | 42 | 50 | * |
| 22 | 60 | 50 | * |
| 23 | 20 | 45 | ** |
| 24 | 42 | 45 | ** |

\* : Formation of cubic boron nitride was confirmed by the X-ray diffractiometry but the yield was 19% or lower.
\*\*: Formation of cubic boron nitride was not confirmed by the X-ray diffractiometry.

From the foregoing results, it is seen that if the pressure is 60 Kbar and the water content is about 5% by weight or higher, it is possible to synthesize cubic boron nitride in a yield of 98% or higher, and that under a pressure of 55 Kbar, if water is incorporated in an amount of about 20% by weight or higher, it is possible to synthesize cubic boron nitride in a yield of 80% or higher. Furthermore, under a pressure of 50 Kbar, if the water content is about 20% by weight or higher, formation of cubic boron nitride can be confirmed by the X-ray diffractiometry, though the yield is 19% or lower, and this yield can be heightened by conducting the reaction for a long time. Under a pressure of 45

Kbar, formation of cubic boron nitride could not be confirmed by the X-ray diffractometry, but there is a possibility that cubic boron nitride will be synthesized to such an extent that its formation can be confirmed by the X-ray diffractiometry, if the reaction time be prolonged. From the practical viewpoint, however, it can be said that the minimum pressure necessary for the synthesis is about 50 Kbar.

As is apparent from the results shown in FIG. 2, the pressure necessary for the synthesis abruptly increases if the water content in the raw material is lower than 3% by weight. Therefore, it is indispensable that water should be present in the raw material in an amount of at least 3% by weight. Though there is no upper limit of the water content, it is apparent that as the water content increases, the amount of the starting boron nitride to be treated is reduced and the yield of cubic boron nitride is correspondingly reduced, and that in case the water content is 100% by weight, the yield is zero.

EXAMPLE 3

Cubic boron nitride was synthesized from highly crystalline graphitic hexagonal boron nitride having an average grain size of about 5μ while varying the water content, pressure, temperature and reaction time as indicated in Table 3. Results obtained are shown in Table 3.

Table 3

| Sample No. | Water Content (% by weight) | Pressure (Kbar) | Temperature (° C.) | Time (min) | Yield (%) |
| --- | --- | --- | --- | --- | --- |
| 1 | 0 | 60 | 1,500 | 30 | ** |
| 2 | 3 | 60 | 1,500 | 30 | 33 |
| 3 | 3 | 55 | 1,500 | 30 | ** |
| 4 | 20 | 60 | 1,500 | 30 | 97 |
| 5 | 20 | 60 | 1,100 | 30 | 28 |
| 6 | 20 | 60 | 1,100 | 60 | 20 |
| 7 | 20 | 60 | 1,100 | 120 | 22 |
| 8 | 40 | 50 | 800 | 120 | * |

\* : Formation of cubic boron nitride was confirmed by the X-ray diffractiometry but the yield was 19% or lower.
\*\*: Formation of cubic boron nitride was not confirmed by the X-ray diffractiometry.

From the foregoing results, it will be readily understood that when highly crystalline hexagonal boron nitride having a welldeveloped grain size is used as the raw material, the water content, pressure and temperature conditions necessary for the synthesis of cubic boron nitride are substantially equal to these conditions necessary for the synthesis when a fine powder of hexagonal boron nitride is used as the raw material, though the reaction time should be prolonged to some extent.

EXAMPLE 4

The same starting boron nitride as used in Example 1 was employed. As the water source, a hydrate LiOH·H₂O was incorporated in the raw material in an amount of about 20% by weight as calculated as water of crystallization, and the raw material was maintained at 1,000° C. and 55 Kbar for 30 minutes. Cubic boron nitride was obtained in a yield of about 79%.

EXAMPLE 5

Graphitic hexagonal boron nitride an average grain size of about 0.05μ was used as the raw material, and aqueous solution of ammonia having an ammonia content of about 26% by weight was incorporated in the raw material in an amount of about 40% by weight. Synthesis of cubic boron nitride from this raw material was examined under such conditions as a pressure of 45 to 60 Kbar, a temperature of 500 to 1,900° C. and a reaction time of 30 minutes. Results obtained are shown in Table 4. The apparatus and measurement method were the same as described in Example 1.

Table 4

| Sample No. | Pressure (Kbar) | Temperature (° C.) | Yield |
| --- | --- | --- | --- |
| 1 | 60 | 1,500 | ◉ |
| 2 | 60 | 1,000 | ◉ |
| 3 | 60 | 800 | ◉ |
| 4 | 60 | 600 | * |
| 5 | 60 | 500 | ** |
| 6 | 55 | 1,900 | ** |
| 7 | 55 | 1,000 | ○ |
| 8 | 55 | 600 | * |
| 9 | 50 | 1,500 | * |
| 10 | 50 | 1,000 | * |
| 11 | 45 | 1,000 | 12** |

◉ : 80% or higher
○ : 20 to 79%
\*: formation of cubic boron nitride was confirmed by the X-ray diffractiometry but the yield was 19% or lower.
\*\*: formation of cubic boron nitride was not confirmed by the X-ray diffractiometry.

As is apparent from the foregoing results, even when aqueous ammonia is used as the water source, the following matters can be observed as in the case where water per se is used.

In X-ray diffraction diagrams of the cubic boron nitride products obtained in this Example, diffraction patterns of the products synthesized at lower temperatures were very broad. Such broad diffraction is due to the fact that the crystal grain of the cubic boron nitride product is very small. From the above synthesis experiments results, it can be said that the minimum temperature and pressure necessary for providing cubic boron nitride to such as extent that its formation can be confirmed by the X-ray diffraction are 600° C. and 50 Kbar, respectively. There is, however, a possibility that cubic boron nitride will be synthesized under lower temperature and/or lower pressure conditions to such extent that formation can be confirmed by X-ray, if the reaction time be prolonged or other appropriate means be adopted. It is also expected that under conditions where the yield of cubic boron nitride determined by the X-ray diffractiometry is 19% or lower, it will be possible to increase the yield by prolonging the reaction time. It is also apparent that even if the temperature and pressure satisfy the above conditions, if these conditions are not included within the thermodynamically stable region of cubic boron nitride, it is impossible to synthesize cubic boron nitride. This fact is evident from the results of sample No. 6.

EXAMPLE 6

By using the same starting boron nitride and aqueous ammonia as used in Example 5, cubic boron nitride was synthesized under such conditions as an aqueous ammonia content of 0 to 40% by weight, a pressure of 45 to 60 Kbar, a temperature of 1,000° C. and a reaction time of 30 minutes. Results obtained are shown in Table 5. The apparatus and measurement method were the same as described in Example 1.

Table 5

| Sample No. | Pressure (Kbar) | Aqueous Ammonia Content (% by weight) | Yield |
| --- | --- | --- | --- |
| 1 | 60 | 0 | ** |
| 2 | 60 | 3 | * |
| 3 | 60 | 10 | ○ |
| 4 | 60 | 40 | ○ |
| 5 | 55 | 3 | ** |
| 6 | 55 | 10 | * |
| 7 | 55 | 20 | ○ |
| 8 | 55 | 40 | ○ |
| 9 | 50 | 10 | ** |
| 10 | 50 | 20 | * |
| 11 | 50 | 40 | * |
| 12 | 45 | 40 | ** |

◉: 80% or higher
○: 20 to 79%
*: formation of cubic boron nitride was confirmed by the X-ray diffractiometry but the yield was 19% or lower.
**: formation of cubic boron nitride could not be confirmed by the X-ray diffractiometry.

As is apparent from the foregoing rsults, even when aqueous ammonia is used as the water source, good results can be obtained as in the case where water per se is employed.

EXAMPLE 7

Highly crystalline graphitic hexagonal boron nitride having an average grain size of about 5$\mu$ was used as the raw material, and cubic boron nitride was synthesized while changing the aqueous ammonia content, pressure, temperature and reaction time as indicated in Table 6. Results obtained are shown in Table 6.

From these results, it will readily be understood that even when highly crystalline boron nitride having a well-developed grain size is used as the raw material, the aqueous ammonia content, pressure and temperature necessary for the synthesis are substantially equal to those necessary for the synthesis when a fine powder of hexagonal boron nitride is used, though the reaction time is prolonged to some extent.

EXAMPLE 8

The experiments were conducted in the same manner as in Example 5 except that the ammonia content in the aqueous ammonia was reduced to half. For instance, when the reaction was conducted at 60 Kbar and 800° C., the yield was higher than 80%. Thus, it was confirmed that the yield of cubic boron nitride was hardly influenced by the ammonia content in the aqueous ammonia to be incorporated in the raw material.

From the results of the foregoing 8 Examples, it is seen that when water is incorporated into a raw material composed of graphitic hexagonal boron nitride in an amount of at least about 3% by weight, cubic boran nitride can be synthesized under minimum pressure and temperature conditions of 50 Kbar and 600° C. regardless of the grain size or crystallinity of the starting hexagonal boron nitride. Although it is deemed possible to synthesize cubic boron nitride at a temperature lower than 600° C. and a pressure lower than 50 Kbar to such an extent that formation of cubic boron nitride can be confirmed by the X-ray diffractiometry if the reaction temperature is prolonged or other suitable means is adopted, from the practical viewpoint, it is preferred that the temperature and pressure be included within the above ranges. Further, water to be used in this invention need not be pure, but a hydrate or an aqueous solution of an alkaline substance such as aqueous ammonia can be used in this invention as the water source and the intended effects of this invention can similarly be obtained. Further, it is seen that any of apparatuses capable of providing a temperature of 600° C. or higher and a pressure of 50 Kbar or higher simultaneously and maintaining said temperature and pressure during the time necessary for the reaction can be used in this invention.

EXAMPLE 9

Wurtzitic hexagonal boron nitride having an average grain size of about 0.1$\mu$ was used as the starting boron nitride, and synthesis of cubic boron nitride was examined under such conditions as a water content of 42% by weight, a pressure of 45 to 65 Kbar, a temperature of 1,000 to 1,900° C. and a reaction time of 30 minutes. Results obtained are shown in Table 7.

Table 7

| Sample No. | Pressure, Kbar | Temperature, ° C. | Yield, % |
| --- | --- | --- | --- |
| 1 | 65 | 1,600 | 100 |
| 2 | 65 | 1,200 | 78 |
| 3 | 58 | 1,600 | 100 |
| 4 | 58 | 1,200 | 63 |
| 5 | 58 | 1,100 | * |

Table 6

| Sample No. | Aqueous Ammonia Content (% by weight) | Pressure (Kbar) | Temperature (° C.) | Time (min.) | Yield |
| --- | --- | --- | --- | --- | --- |
| 1 | 0 | 60 | 1,500 | 30 | ** |
| 2 | 3 | 60 | 1,500 | 30 | ○ |
| 3 | 3 | 55 | 1,500 | 30 | ** |
| 4 | 20 | 60 | 1,500 | 30 | ○ |
| 5 | 20 | 60 | 1,000 | 30 | * |
| 6 | 20 | 60 | 1,000 | 60 | ○ |
| 7 | 20 | 60 | 1 000 | 120 | ○ |
| 8 | 40 | 50 | 800 | 120 | * |

◉: 80% or higher
○: 20 to 79%
*: formation of cubic boron nitride was confirmed by the X-ray diffractiometry but the yield was 19% or lower.
**: formation of cubic boron nitride could not be confirmed by the X-ray diffractiometry.

Table 7-continued

| Sample No. | Pressure, Kbar | Temperature, °C | Yield, % |
|---|---|---|---|
| 6 | 58 | 1,000 | ** |
| 7 | 55 | 1,900 | ** |
| 8 | 55 | 1,800 | 48 |
| 9 | 55 | 1,600 | 98 |
| 10 | 55 | 1,400 | 90 |
| 11 | 55 | 1,300 | 85 |
| 12 | 55 | 1,200 | 58 |
| 13 | 55 | 1,100 | * |
| 14 | 55 | 1,000 | ** |
| 15 | 52 | 1,600 | 48 |
| 16 | 52 | 1,400 | 32 |
| 17 | 50 | 1,800 | ** |
| 18 | 50 | 1,600 | * |
| 19 | 50 | 1,400 | * |
| 20 | 50 | 1,200 | * |
| 21 | 50 | 1,100 | ** |
| 22 | 47 | 1,600 | ** |
| 23 | 45 | 1,400 | ** |
| 24 | 45 | 1,200 | ** |

*: formation of cubic boron nitride was confirmed by the X-ray diffractiometry but the yield was 19% or lower.
**: formation of cubic boron nitride could not be confirmed by the X-ray diffractiometry.

The apparatus and measurement method were the same as described in Example 1.

The pressure and temperature range 11 capable of providing cubic boron nitride, which was determined bases on the foregoing results is shown in FIG. 3. In FIG. 3, the ordinate indicates the synthesis pressure (Kbar) and the abscissa indicates the synthesis temperature (° C.). At points ● cubic boron nitride was synthesized in a yield of 80% or higher, at points ◐ cubic boron nitride was synthesized in a yield of 20 to 79%, at points ○ formation of cubic boron nitride was confirmed by the X-ray diffraction but the yield was 19% or lower, and at points ⊗ formation of cubic boron nitride was not confirmed by the X-ray diffractiometry. The region 11 is a region in which cubic boron nitride could be synthesized, the region 12 is a region where cubic boron nitride could not be synthesized to such an extent that its formation could be confirmed by the X-ray diffractiometry, and the region 13 is a region in which graphitic hexagonal boron nitride was thermodynamically stable. The curve 14 is a thermodynamic equilibrium curve of cubic boron nitride and hexagonal boron nitride.

From the foregoing synthesis experiment results, it is seen that when wurtzitic type hexagonal boron nitride is used as the raw material, the minimum temperature and pressure necessary for synthesizing cubic boron nitride to such an extent that its formation can be confirmed by the X-ray diffractiometry are 1,100° C. and 50 Kbar, respectively. There is a possibility that cubic boron nitride may be synthesized under lower temperature and lower pressure conditions, if the reaction time be prolonged or other suitable means be adopted. Under such conditions that the yield of cubic boron nitride determined by the X-ray diffractiometry is 19% or lower, the yield can be improved by conducting the reaction for a long time.

Further, even if these temperature and pressure conditions are satisfied, when these conditions are not included in the thermodynamically stable temperature and pressure range of cubic boron nitride, it is apparently impossible to synthesize cubic boron nitride. This fact is evident from the results of sample No. 7. Since it is known that cubic boron nitride is thermodynamically stable on the left side of the equilibrium curve 14 shown in FIG. 3, it is indispensable that both the synthesis temperature and pressure should be included in this region.

EXAMPLE 10

Figure 4:
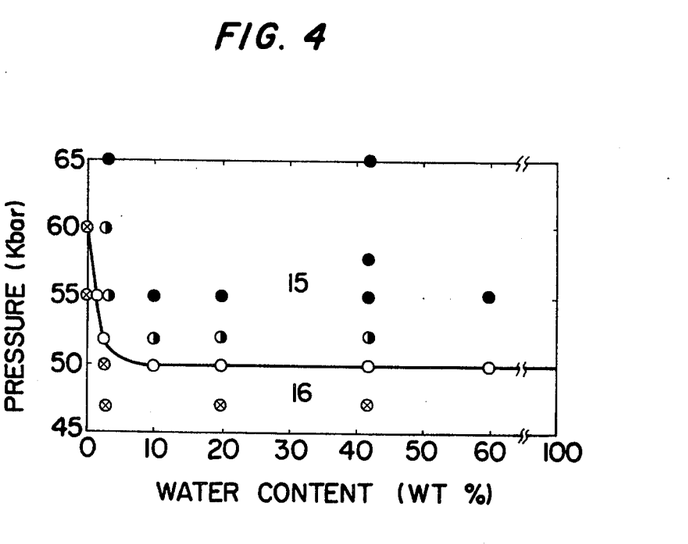
FIG. 4 is a graphical representation illustrating ranges of the pressure and water content in the raw material which are necessary for synthesizing cubic boron nitride when wurtzitic type hexagonal boron nitride is used as the raw material and the synthesis temperature is 1,600°C.

Cubic boron nitride was synthesized from the same starting boron nitride as used in Example 9 under such conditions as a water content of 0 to 60% by weight, a pressure of 47 to 65 kbar, a temperature of 1,600° C. and a reaction time of 30 minutes, to obtain results shown in Table 8. The apparatus and measurement method were the same as described in Example 1. Ranges of the pressure and water content capable of providing cubic boron nitride, determined based on these results, are shown in FIG. 4. In FIG. 4, the ordinate indicates the synthesis pressure (Kbar) and the abscissa indicates the water content (% by weight) in the raw material. The region 15 is a region where cubic boron nitride could be synthesized, and the region 16 is a region in which cubic boron nitride could not be synthesized to such an extent that its formation could be confirmed by the X-ray diffractiometry. Symbols of measurement points such as ● have the same meaning as mentioned in Example 9.

Table 8

| Sample No. | Water Content (% by weight) | Pressure (Kbar) | Yield (%) |
|---|---|---|---|
| 1 | 42 | 65 | 100 |
| 2 | 3 | 65 | 98 |
| 3 | 3 | 60 | 76 |
| 4 | 0 | 60 | ** |
| 5 | 42 | 58 | 100 |
| 6 | 60 | 55 | 100 |
| 7 | 42 | 55 | 98 |
| 8 | 20 | 55 | 95 |
| 9 | 10 | 55 | 92 |
| 10 | 3 | 55 | 53 |
| 11 | 1 | 55 | * |
| 12 | 0 | 55 | ** |
| 13 | 42 | 52 | 48 |
| 14 | 20 | 52 | 40 |
| 15 | 10 | 52 | 24 |
| 16 | 3 | 52 | * |
| 17 | 60 | 50 | * |
| 18 | 42 | 50 | * |
| 19 | 20 | 50 | * |
| 20 | 10 | 50 | * |
| 21 | 3 | 50 | ** |
| 22 | 42 | 47 | ** |
| 23 | 20 | 47 | ** |
| 24 | 3 | 47 | ** |

*: formation of cubic boron nitride was confirmed by the X-ray diffractiometry but the yield was 19% or lower.
**: formation of cubic boron nitride was not confirmed by the X-ray diffractiometry.

From the foregoing results, it is seen that if the pressure is 55 Kbar and the water content is about 10% by weight or higher, it is possible to synthesize cubic boron nitride in a yield of 90% or higher, and that under a pressure of 52 Kbar, if the water is incorporated in an amount of about 10% by weight or higher, it is possible to synthesize cubic boron nitride in a yield of 20% or higher. Furthermore, under a pressure of 50 Kbar, if the water content is about 10% by weight or higher, formation of cubic boron nitride can be confirmed by the X-ray diffractiometry, though the yield is 19% or lower, and this yield can be heightened by conducting the reaction for a long time. Under a pressure of 47 Kbar, formation of cubic boron nitride could not be confirmed by the X-ray diffractiometry, but there is a possibility that cubic boron nitride will be synthesized to such an extent that its formation can be confirmed by the X-ray diffractiometry, if the reaction time be prolonged. From the practical viewpoint, however, it can be said that the minimum pressure necessary for the synthesis is about 50 Kbar.

As is apparent from the result shown in FIG. 4, the pressure necessary for the synthesis abruptly increases if the water content in the raw material is lower than 1% by weight. Therefore, it is indispensable that water should be present in the raw material in an amount of at least 1% by weight, and it is preferred that the water content be at least 3% by weight. Though there is no upper limit of the water content, it is apparent that as the water content increases, the amount of the starting boron nitride to be treated is reduced and the yield of cubic boron nitride is correspondingly reduced, and that in case the water content is 100% by weight, the yield is zero.

EXAMPLE 11

The same starting boron nitride as used in Example 9 was employed. As the water source, a hydrate LiOH·H$_2$O was incorporated in the raw material in an amount of about 20% by weight as calculated as water of crystallization, and the raw material was maintained at 1,600° C. and 55 Kbar for 30 minutes. Cubic boron nitride was obtained in a yield of about 98%.

EXAMPLE 12

Wurtzitic type hexagonal boron nitride having an average grain size of about 0.1μ was used as the raw material, and an aqeous solution of NaOH having a concentration of about 5 mole% was incorporated in the raw material in an amount of about 0 to 60% by weight. Synthesis of cubic boron nitride from this raw material was examined under such conditions as a pressure of 45 to 60 Kbar, a temperature of 800 to 1,900° C. and a reaction time of 30 minutes. Results obtained are shown in Table 9. The apparatus and measurement method were the same as described in Example 1.

As is apparent from the foregoing results, even when an aqueous solution of an alkaline substance is used as the water source, good results can be obtained as in the case where water per se is employed.

EXAMPLE 13

The experiments were conducted in the same manner as in Example 12 except that a KOH aqueous solution of 5 mole concentration and a NH$_2$OH aqueous solution of 5 mole concentration were used. Each solution was incorporated in the starting boron nitride in an amount of 42% by weight. When the reaction was conducted at 55 Kbar and 1,600° C. for 30 minutes, the yield was higher than 90% in each case.

From the results of the foregoing 5 Examples, it is seen that water is incorporated into a raw material composed of wurtzitic tipe hexagonal boron nitride in an amount of at least about 1% by weight, preferably at least about 3% by weight, cubic boron nitride can be synthesized under minimum presure and temperature conditions of 50 Kbar and 1,100° C. regardless of the grain size or crystallinity of the starting hexagonal boron nitride. Although it is deemed possible to synthesize cubic boron nitride at a temperature lower than 1,100° C. and a pressure lower than 50 Kbar to such an extend that formation of cubic boron nitride can be confirmed by the X-ray diffractiometry if the reaction time is prolonged or other suitable means is adopted, from the practical viewpoint, it is preferred that the temperature and pressure be included within the above ranges. Further, water to be used in this invention need not be pure, but a hydrate or an aqueous solution of an alkaline substance such as aqueous ammonia and an aqueous solution of NaOH or KOH can be used in this invention as the water source and the intended effects of this invention can similarly be obtained. Further, it is seen that any of the apparatuses capable of providing a temperature of 1,100° C. or higher and a pressure of 50

Table 9

| Sample No. | NaOH Aqueous Solution Content (% by weight) | Pressure (Kbar) | Temperature (° C.) | Yield (%) |
| --- | --- | --- | --- | --- |
| 1 | 42 | 65 | 1,600 | 100 |
| 2 | 42 | 65 | 1,200 | 79 |
| 3 | 3 | 65 | 1,600 | 97 |
| 4 | 3 | 60 | 1,600 | 78 |
| 5 | 0 | 60 | 1,600 | ** |
| 6 | 42 | 58 | 1,200 | 67 |
| 7 | 42 | 58 | 1,100 | <10 |
| 8 | 42 | 55 | 1,900 | ** |
| 9 | 42 | 55 | 1,600 | 98 |
| 10 | 42 | 55 | 1,300 | 87 |
| 11 | 42 | 55 | 1,200 | 60 |
| 12 | 42 | 55 | 1,100 | <10 |
| 13 | 42 | 55 | 1,100 | ** |
| 14 | 60 | 55 | 1,600 | 100 |
| 15 | 20 | 55 | 1,600 | 97 |
| 16 | 10 | 55 | 1,600 | 94 |
| 17 | 3 | 55 | 1,600 | 56 |
| 18 | 1 | 55 | 1,600 | <10 |
| 19 | 0 | 55 | 1,600 | ** |
| 20 | 42 | 52 | 1,600 | 52 |
| 21 | 42 | 52 | 1,400 | 38 |
| 22 | 20 | 52 | 1,600 | 43 |
| 23 | 10 | 52 | 1,600 | 28 |
| 24 | 3 | 52 | 1,600 | <10 |
| 25 | 42 | 50 | 1,600 | <10 |
| 26 | 42 | 50 | 1,400 | <10 |
| 27 | 42 | 50 | 1,200 | <10 |
| 28 | 20 | 50 | 1,600 | <10 |
| 29 | 10 | 50 | 1,600 | <10 |
| 30 | 3 | 50 | 1,600 | <10 |
| 31 | 42 | 45 | 1,400 | ** |
| 32 | 20 | 45 | 1,600 | ** |

**: formation of cubic boron nitride could not be confirmed by the X-ray diffractiometry.

Kbar or higher simultaneously and maintaining said temperature and pressure during the time necessary for the reaction can be used in this invention.

As is apparent from the results of the foregoing Examples, cubic boron nitride can easily be synthesized at a high efficiency by incorporating water into a raw material composed of graphtic hexagonal boron nitride or wurtzitic type hexagonal boron nitride in an amount of at least 3% by weight and maintaining the raw material at a high temperature under a pressure of at least about 50 Kbar.

It will be appreciated from the foregoing examples that the acceptable level for the yield to be obtained is several percent from the practical viewpoint.

While the novel principles of the invention have been described, it will be understood that various omissions, modifications and changes in these principles may be made by one skilled in the art without departing from the spirit and scope of the invention.

What is claimed is:

1. In the process for synthesizing cubic boron nitride by using graphitic hexagonal boron nitride as the raw material and applying to said raw material such high temperature and high pressure that cubic boron nitride is thermodynamically stable, and improvement wherein water is incorporated in the raw material in an amount of at least 3% by weight, the high pressure is applied for at least 2 minutes, the applied temperature is at least about 600° C. and the applied high pressure is at least about 50 Kbar.

2. The process for the production of cubic boron nitride according to claim 1, wherein and the applied high temperature is about 600° C. to about 800° C.

3. The process for the production of cubic boron nitride according to claim 1, wherein an aqueous solution of $NH_4OH$ is used as the water source and incorporated into the raw material.

4. The process for the production of cubic boron nitride according to claim 3, wherein the applied high temperature is about 600° to about 800° C.

5. The process for the production of cubic boron nitride according to claim 1, wherein water is incorporated in an amount of at least about 10% 20% by weight.

6. The process for the production of cubic boron nitride according to claim 1, wherein the high temperature and high pressure are applied for at least about 2 minutes.

7. The process for the production of cubic boron nitride according to claim 1, wherein the high temperature and high pressure employed are within the thermodynamically stable region of cubic boron nitride, a part of which is shown in FIG. 1 to the left of curve 4 of the accompanying drawings.

8. The process for the production of cubic boron nitride according to claim 1, wherein the applied high temperature is between about 600° C to about 1900° C.

9. The process for the production of cubic boron nitride according to claim 8, wherein the applied high pressure is between about 50 Kbar to about 65 Kbar.

10. The process for the production of cubic boron nitride according to claim 1, wherein the amount of water incorporated in the raw material is between about 3% by weight to about 67% by weight.

11. The process for the production of cubic boron nitride according to claim 1, wherein the high temperature and high pressure are applied for a period between about 2 minutes and about 24 hours.

12. The process for the production of cubic boron nitride according to claim 11, wherein the high temperature and high pressure are applied for at least about 30 minutes.

13. The process for the production of cubic boron nitride according to claim 1, wherein the cubic boron nitride produced has a crystal size of not more than $.01\mu$.

* * * * *